DETECTOR SYSTEM CORRECTING FOR SINGLE SIDEBAND DISTORTION

Filed Feb. 23, 1956

United States Patent Office 2,914,606

Patented Nov. 24, 1959

2,914,606

DETECTOR SYSTEM CORRECTING FOR SINGLE SIDEBAND DISTORTION

Bernard D. Loughlin, Lynbrook, N.Y., assignor to Hazeltine Research, Inc., Chicago, Ill., a corporation of Illinois Application February 23, 1956, Serial No. 567,134

11 Claims. (Cl. 178—5.4)

*General*

Figure 1:
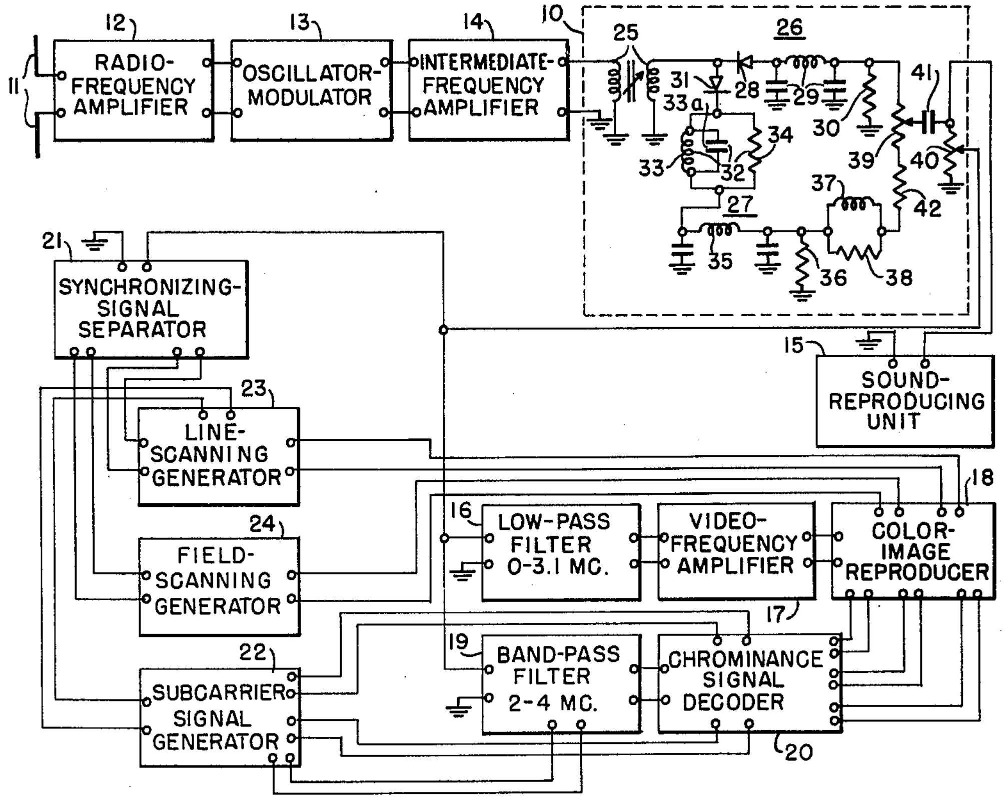

This invention relates to detector systems for modulated wave signals and, more particularly, to detector systems for televised color picture wave signals.

Heretofore, color-television receivers employing linear envelope picture-signal detectors, in general, have been subject to picture distortion inherently caused by such a detector upon the application thereto of an intermediate-frequency signal modulated by a composite video signal having luminance and chrominance components. In particular, the reproduced picture ordinarily suffers luminance and chrominance distortion, namely, luminance and chrominance suppression in negative modulation transmission systems. This distortion arises because the presence of a single-side-band chrominance subcarrier signal at the detector causes an effective envelope variation of the luminance carrier signal and vice versa. The detector responds to this envelope variation and therefore develops a distortion component.

Also, in receivers of the intercarrier type, the sound carrier signal is applied to the picture-signal detector and its presence together with the chrominance subcarrier signal causes the detector to derive a sound-color beat note appearing as a 920-kilocycle luminance distortion component. Heretofore, this distortion component has been tolerated in some receivers or minimized by attenuating the sound carrier to an extreme degree in stages prior to the detector. Such extreme attenuation of the sound carrier is undesirable in an intercarrier type of television receiver in which the beat note between the picture carrier and the sound carrier is utilized in the sound-reproducing unit because the signal-to-noise ratio is undesirably low for weak sound signals and also additional sound amplification must be supplied in later stages.

Attenuation of the sound carrier also ordinarily results in some amplitude or phase distortion of the color subcarrier because of the close frequency spacing between the two signals, resulting in color distortion.

Another system for avoiding distortion caused by the beating together of the sound carrier and chrominance subcarrier is one which employs separate sound and luminance-signal detectors. Also, an exalted carrier system is proposed in applicant's copending application Serial No. 447,762, filed August 4, 1954, and entitled "Picture-Signal Deriving System."

It is an object of the present invention, therefore, to provide a new and improved detector system for modulated wave signals which avoids one or more of the above-mentioned disadvantages and limitations of prior such systems.

It is another object of the invention to provide a new and improved detector system for televised color picture wave signals in which picture distortion is minimized.

It is another object of the invention to provide a new and improved detector system for televised color picture wave signals in which luminance distortion is minimized.

It is another object of the invention to provide a new and improved detector system for televised color picture wave signals in which chrominance distortion is minimized.

It is another object of the invention to provide a new and improved detector system for televised color picture wave signals in which a 920-kilocycle luminance distortion component caused by beating together of the sound carrier and color subcarrier is minimized.

It is another object of the invention to provide a new and improved linear envelope detector system for televised color picture wave signals of simple and inexpensive construction.

It is another object of the invention to provide a new and improved linear envelope detector system for televised color picture wave signals having a single output circuit for luminance and chrominance components.

In accordance with a particular form of the invention, a detector system for modulated wave signals comprises circuit means for supplying an amplitude-modulated carrier wave signal, its modulation components, and a single-side-band signal component. The detector system also includes a plurality of envelope detector circuits coupled to the aforesaid circuit means and individually subject to output signal distortion introduced by the aforesaid single-side-band component for deriving signal components representative of different relative proportions of the aforesaid modulation components and distortion. The detector system also includes circuit means for combining proportions of the aforesaid derived components having distortions of opposite sense to derive an output signal representative of the aforesaid modulation components and having substantially reduced distortion.

By an envelope detector circuit is meant a detector circuit for deriving a signal component representative of the envelope of the supplied signal.

For a better understanding of the present invention, together with other and further objects thereof, reference is had to the following description taken in connection with the accompanying drawing, and its scope will be pointed out in the appended claims.

Figure 1A:
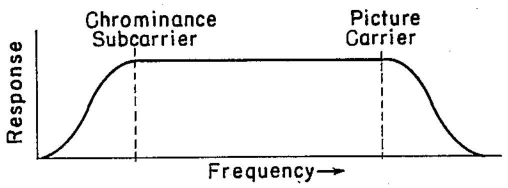
Figure 1B:
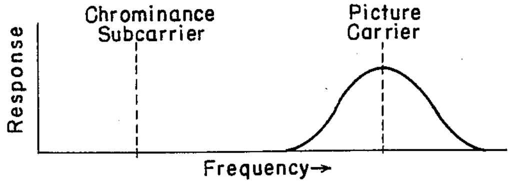
Figure 1C:
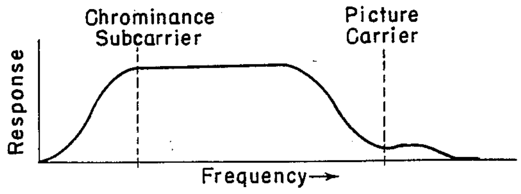

Referring to the drawing:

Fig. 1 is a circuit diagram, partly schematic, of a color-television receiver including a detector system constructed in accordance with the invention, and Figs. 1*a*, 1*b*, and 1*c* are graphs to aid in explaining the operation of the detector system of the Fig. 1 receiver.

*General description and explanation of operation of Fig. 1 receiver*

Referring now more particularly to Fig. 1 of the drawing, the color-television receiver there represented may be of conventional construction with the exception of the detector system 10 which is constructed in accordance with the invention. For example, the receiver may be of a constant luminance type described and claimed in applicant's copending application Serial No. 159,212, filed May 1, 1950, and entitled "Color Television System." Receivers of this type are further described in the October, 1951 issue of the Proceedings of the I.R.E. in an article entitled "Recent Improvements in Band-Shared Simultaneous Color-Television Systems," by applicant and in an article by Hirsch, Bailey, and applicant entitled "Principles of NTSC Compatible Color Television," Electronics, February 1952.

The Fig. 1 receiver comprises an antenna system 11 to which are coupled, in cascade and in the order named, a radio-frequency amplifier 12, an oscillator-modulator 13, and an intermediate-frequency amplifier 14, all of conventional construction for deriving an intermediate-frequency composite color-television signal. The detector system 10, constructed in accordance with the invention and more fully described subsequently, is coupled to intermediate-frequency amplifier 14 for deriving from the intermediate-frequency signal applied thereto a composite video signal including luminance and chrominance components as well as a sound intercarrier beat-note signal. The output circuit of the detector system 10 is coupled to a sound-reproducing unit 15 of conventional construction. The output circuit of the detector system 10 is also coupled to a luminance channel and a chrominance channel of the receiver. The luminance channel includes a low-pass filter 16 having a pass band of, for example, 0–3.1 megacycles and coupled through a video-frequency amplifier 17 to a color-image reproducer 18, all of conventional construction. The filter 16 rejects the chrominance subcarrier signal while translating the luminance signal for amplification by the amplifier 17 and application to the reproducer 18 in a usual manner.

The chrominance channel of the receiver includes a band-pass filter 19 having a pass band of, for example, 2–4 megacycles coupled to a chrominance-signal decoder 20 of conventional construction for deriving, for example, *R—Y*, *G—Y*, and *B—Y* chrominance signals for application to the reproducer 18. One output circuit of the band-pass filter 19 is coupled to a gated input circuit of a stabilized subcarrier signal generator 22, of conventional phase-controlled oscillator design and responsive to the color burst synchronizing signal. The unit 22 has a pair of output circuits connected to input circuits of the chrominance-signal decoder 20 for providing a pair of phase-displaced unmodulated subcarrier signals, for example, signals in phase quadrature which individually beat with the modulated signal component applied to the decoder 20 by the filter 19 to derive in the decoder 20 the *R—Y*, *G—Y*, and *B—Y* color-difference signals.

The output circuit of the detector system 10 is also coupled to a synchronizing-signal separator 21 for separating the line-synchronizing and field-synchronizing signals from the video-frequency signals applied thereto by the system 10.

The receiver also includes line-scanning and field-scanning generators 23 and 24 connected in a conventional manner to separator 21 and to the scanning circuits of the color-image reproducer 18 for effecting scanning. The output circuit of the line-scanning generator 23 is also connected to the gated circuit of the subcarrier signal generator 22 for separating the color burst synchronizing signal by means of a gating operation to control the oscillator phase.

*Description of detector system of Fig. 1 receiver*

Considering now the detector system 10 in detail, the detector system comprises circuit means for supplying a modulated carrier wave signal, its modulation components, and a single-side-band signal component. This circuit means may, for example, be a conventional intermediate-frequency slug-tuned transformer 25 coupled to the output circuit of the intermediate-frequency amplifier 14 for supplying the picture carrier wave signal and its modulation components including a chrominance subcarrier signal component in single-side-band relation with the picture carrier signal. The picture carrier signal, of course, has double-side-band and vestigial-side-band modulation components comprising a video-freqency luminance-signal component and the single-side-band chrominance subcarrier signal component.

The detector system 10 also includes a plurality of detector circuits 26, 27 coupled to the supply circuit means and individually subject to output signal distortion introduced by the single-side-band component for deriving signal components representative of different relative proportions of the modulation components and the distortion. This output signal distortion is luminance-signal component distortion introduced by the chrominance subcarrier component and distortion of the chrominance subcarrier component introduced by the picture carrier signal as well as luminance distortion introduced by the vestigial-side-band components. The distortion also includes a 920-kilocycle luminance distortion component resulting from the application of the sound carrier signal to the detector in the presence of the chrominance subcarrier signal.

The detector circuits 26 and 27 preferably are a pair of linear envelope detector circuits. The detector circuit 26 includes, for example, a diode 28 coupled between the transformer 25 and a low-pass video-frequency filter 29 and load resistor 30. The detector circuit 27 includes a diode 31 coupled between the transformer 25 and a frequency-responsive circuit 32 for reducing the magnitude of the derived signal component with respect to the distortion to cause the signal components derived by the detectors to be representative of different relative proportions of the modulation components and the distortion. The frequency-responsive circuit 32 includes a resonant circuit comprising inductor 33 and condenser 33*a* tuned to the intermediate-frequency picture carrier signal and shunted by resistor 34 which determines the Q of the circuit. A low-pass filter 35 and load resistor 36 are coupled to the resonant circuit 33, 33*a* for developing the modulation components at video frequency across resistor 36.

The detector system also includes circuit means for combining proportions of the derived components having distortions of opposite sense to derive an output signal representative of the modulation components and having substantially reduced distortion, that is, luminance- or chrominance-signal component distortion. This circuit means preferably includes a frequency-responsive network 37, 38, 42 and an adjustable voltage divider 39 for combining proportions of the derived components having distortions of substantially equal magnitude and of opposite sense at luminance frequency and having distortions of substantially equal magnitude and opposite sense at chrominance subcarrier frequency. If it is desired to provide complete cancellation of only the luminance-signal distortion or only the chrominance subcarrier signal distortion, then the network 37, 38 may be omitted and replaced by a direct connection between resistors 36 and 42.

An adjustable voltage divider 40 is coupled through condenser 41 to the adjustable tap of voltage divider 39 to provide a single adjustable-gain-control element for both the luminance and chrominance components.

*Operation of detector system of Fig. 1 receiver*

Considering now the operation of the detector system 10, the transformer 25 applies the picture carrier signal modulated by the composite video signal to the cathode of diode 28, which operates in conjunction with filter 29 and load resistor 30 to derive across the resistor 30 the luminance-signal component and the chrominance subcarrier signal component. These components are, however, subject to distortion caused by the application to the detector 26 of a picture carrier signal, a single-side-band chrominance subcarrier signal, and a sound carrier signal. The detector 26 has a frequency-response characteristic represented in Fig. 1*a*, that is, the graph of Fig. 1*a* represents the frequency-response characteristic from the transformer 25 to the voltage divider 40, exclusive of detector 27.

As demonstrated subsequently in mathematical terms, the single-side-band chrominance subcarrier signal causes an effective envelope variation of the picture carrier signal. This envelope variation is not sinusoidal and has a direct-current component which alters the luminance level represented by the direct-current component of the picture carrier signal. The direct-current component of the envelope variation is of such polarity relative to the detected luminance component that it increases the picture carrier signal amplitude which, in a negative modulation system, reduces the luminance level. In a positive modulation system, the luminance level would increase as a result of the same direct-current component. Also, single-side-band reception of the chrominance subcarrier on the picture carrier signal causes a chrominance distortion component which results in a suppression of the chrominance of the reproduced picture.

The transformer 25 also applies the picture carrier signal modulated by the composite video signal to the anode of diode 31 which operates in conjunction with resonant circuit 33, 33*a*, filter 35, and load resistor 36 to derive across resistor 36 the luminance and chrominance subcarrier signal components with opposite polarity to the corresponding components developed across resistor 30 in detector circuit 26.

The frequency-response curve of resonant circuit 33, 33*a* is represented in Fig. 1*b*. This circuit operates as a radio-frequency load to the picture carrier signal which reduces the amplitude of the picture carrier signal. Accordingly, the detector circuit 27 has a resultant frequency-response characteristic represented in Fig. 1*c*.

The distortion component developed by detector circuit 27 is, however, not attenuated by the resonant circuit 33, 33*a* to the same extent as the picture carrier signal because it is dependent also on the amplitude of the chrominance subcarrier signal. Accordingly, a proportion of the output signal of the detector circuit 27 may be added to a proportion of the output signal of detector circuit 26 with opposite polarity to cancel the distortion developed by detector circuit 26 while nevertheless developing a resultant output picture signal.

The proportions of the output signals of detector circuits 26 and 27 which are combined are controlled by the relative values of resistors 30 and 36, the values of the coupling network 37, 38, 42, and by the adjustment of the voltage divider 39.

Proportioning the values of elements 37, 38, 42, 39 to cancel luminance distortion caused by the single-side-band chrominance subcarrier signal also effects cancellation of the 920-kilocycle luminance distortion jointly caused by the chrominance subcarrier and the sound carrier.

Considering now the operation of the detector system 10 in mathematical terms, the signal developed across the secondary winding of the transformer 25 may be represented by the following equation:

$$e=m_1 \cos \omega_1 t+m_2 \cos (\delta+\omega_1)t \qquad (1)$$

where $e$=instantaneous magnitude of the composite carrier signal including its chrominance subcarrier $m_1$=instantaneous picture carrier signal amplitude level (exclusive of chrominance subcarrier)

$\omega_1$=intermediate-frequency picture carrier angular velocity $m_2$=instantaneous chrominance subcarrier signal amplitude $\delta$=difference angular velocity between intermediate-frequency picture carrier and intermediate-frequency chrominance subcarrier signals (which is the video chrominance subcarrier angular velocity)

It may be shown that the envelope variation (V) resulting from the two signal components represented by Equation 1 is:

$$V=[m_1^2+m_2^2+2m_1m_2 \cos \delta t]^{1/2} \qquad (2)$$

Rewriting Equation 2:

$$V=(m_1^2+m_2^2)^{1/2}\ (1+a \cos \delta t)^{1/2} \qquad (3)$$

where $$a=\frac{2m_1m_2}{m_1^2+m_2^2} \qquad (3a)$$

Equation 3 may be analyzed in terms of a power series with corresponding frequency terms collected as follows:

$$e_0=(m_1^2+m_2^2)^{1/2}\left(1-\frac{a^2}{16}-\frac{15a^4}{1024}\cdots\right) \qquad (4)$$

$$e_1=(m_1^2+m_2^2)^{1/2}\frac{a}{2}\left(1+\frac{3a^2}{32}+\frac{35a^4}{1024}\cdots\right) \qquad (5)$$

$$e_2=(m_1^2+m_2^2)^{1/2}\left(-\frac{a^2}{16}-\frac{5a^4}{256}\cdots\right) \qquad (6)$$

where $e_0$, $e_1$, $e_2$=amplitude of the direct-current, fundamental chrominance subcarrier frequency, and second harmonic terms, respectively, of the envelope variation.

Let:

$$r=\frac{m_2}{m_1} \qquad (7)$$

Then from Equations 3*a* and 7:

$$a=\frac{2r}{1+r^2} \qquad (8)$$

Rewriting Equations 4–6, inclusive, with substitutions from Equations 7 and 8:

$$e_0=m_1\left(1+\frac{1}{4}r^2+\frac{1}{64}r^4\cdots\right) \qquad (9)$$

$$e_1=m_1r\left(1-\frac{1}{8}r^2-\frac{1}{64}r^4\cdots\right) \qquad (10)$$

$$e_2=-m_1\left(\frac{r^2}{4}-\frac{1}{16}r^4\cdots\right) \qquad (11)$$

In the following considerations, the terms of Equations 9, 10, and 11 of higher order than square law will be neglected because of their small amplitudes.

Let:

$a_1$=ratio of responses of detector circuit 26 to chrominance and picture signals, respectively $a_2$=ratio of responses of detector circuit 27 to chrominance and picture signals, respectively The effective picture carrier frequency input signal to detector 26 may then be expressed as $m_1$ units and the chrominance subcarrier signal as $a_1rm_1$ units. Similarly, the effective carrier frequency input signal to detector 27 may be expressed as $pm_1$ units and the chrominance subcarrier signal as $a_2prm_1$ units, where $p$ is the fraction of picture carrier frequency input signal to the detector 26 which is effective as the input signal to the detector 27.

From Equations 9, 10, and 11 the amplitude of the direct-current component ($e_{01}$) derived by detector 26 may be expressed:

$$e_{01}=m_1\left(1+\frac{1}{4}a_1^2r^2\right) \qquad (12)$$

Also, the amplitude of the fundamental component ($e_{11}$) derived by detector 26 may be expressed:

$$e_{11}=a_1rm_1\left(1-\frac{1}{8}a_1^2r^2\right) \qquad (13)$$

Similarly, the amplitude of the direct-current component derived by detector 27 may be expressed:

$$e_{02}=pm_1\left(1+\frac{1}{4}a_2^2r^2\right) \qquad (14)$$

Also, the amplitude of the fundamental component derived by detector 27 may be expressed:

$$e_{12}=a_2rpm_1\left(1-\frac{1}{8}a^2r^2\right) \qquad (15)$$

The combined direct-current components of the output signals of the detectors 26 and 27 may be expressed as follows:

$$N_0=k_1(e_{01}-ke_{02}) \qquad (16)$$

where $N_0$=the combined direct-current components $k_1$=a constant representing the proportion of signal $e_{01}$ developed at tap of voltage divider 39

$k$=a constant representing the relative proportion of signal $e_{02}$ combined with signal $e_{01}$ Then, from Equations 12, 14, and 16:

$$N_0=k_1m_1\left[1-kp+\frac{r^2}{4}(a_1^2-kpa_2^2)\right] \quad (17)$$

The combined fundamental components of the output signals of detectors 26 and 27 may be expressed:

$$N_1=k_1(e_{11}-ke_{12}) \quad (18)$$

where $N_1$=the combined fundamental components.

Then, from Equations 13, 15, and 18:

$$N_1=k_1m_1\left[r(a_1-kpa_2)-\frac{r^3}{8}(a_1^3-kpa_2^3)\right] \quad (19)$$

The desired direct-current or luminance component is represented by that term of Equation 17 independent of $r$, namely:

$$N_{0d}=k_1m_1[1-kp] \quad (20)$$

Similarly, the desired chrominance component is represented by that term of Equation 19 independent of $r^3$ and may be expressed:

$$N_{1d}=k_1m_1r(a_1-kpa_2) \quad (21)$$

The luminance distortion is represented by that term of Equation 17 dependent on $r^2$, namely:

$$D_0=\frac{r^2m_1k_1}{4}(a_1^2-kpa_2^2) \quad (22)$$

The chrominance distortion is represented by that term of Equation 19 dependent on $r^3$, namely:

$$D_1=-\frac{r^3k_1m_1}{8}(a_1^3-kpa_2^3) \quad (23)$$

Thus, from Equation 22 in order to provide zero luminance distortion:

$$kp=\left(\frac{a_1}{a_2}\right)^2 \quad (24)$$

From Equation 24 in order to provide zero chrominance distortion:

$$kp=\left(\frac{a_1}{a_2}\right)^3 \quad (25)$$

From Equations 24 and 25 it is evident that the cross-coupling factor "$k$" must have different values at direct-current frequency and subcarrier frequency in order to provide both luminance and chrominance distortion cancellation. In other words, the cross-coupling network 37, 38, 42, and 39 preferably is frequency-selective having a value indicated by Equation 24 at direct-current frequency and having a value indicated by Equation 25 at chrominance subcarrier frequency.

It can be shown that the square-law relations expressed by Equations 14 and 15 are good approximations of the actual output signal components of detector 27 for values of $a_2r$ to a maximum of approximately 3.

Since the maximum ratio of chrominance and luminance in a received signal is approximately .7 for the cyan color, the maximum value of $a_2$ which allows good cancellation over the entire range of values of $r$ of the received signal is approximately 4.

It is desirable to employ a detector circuit providing a value of $a_2$ approaching a maximum for several reasons. It may be seen from Equation 21 that the value $a_1$ preferably is reasonably large, for example unity, to provide a substantial chrominance gain in the detector in order that the required chrominance gain relative to luminance gain in the following video-frequency stages is not too great. Note from Equations 20, 24, and 25 that in order to obtain a luminance output signal of large magnitude from the detector, the value $a_2$ should be very much greater than the value $a_1$.

From the foregoing analysis it will be apparent that by combining proper proportions of the components derived by detector circuits 26 and 27 with distortions of opposite sense, a resultant output signal having substantially reduced distortion can be derived. The system has the important advantage that it is capable of minimizing both luminance and chrominance distortion. Moreover, since the detector minimizes the sound carrier color subcarrier beat note, sound carrier traps can be minimized with consequent reduction of cost. Also, conventional intercarrier performance can be obtained without losing signal-to-noise ratio. Further, the band width and transient response of the chrominance channel are improved. Additionally, tuning for minimum sound carrier color subcarrier beat note becomes less critical and color varies less with tuning.

While there has been described what is at present considered to be the preferred embodiment of this invention, it will be obvious to those skilled in the art that various changes and modifications may be made therein without departing from the invention, and it is therefore, aimed to cover all such changes and modifications as fall within the true spirit and scope of the invention.

What is claimed is:

1. A detector system for modulated wave signals comprising: circuit means for supplying an amplitude-modulated carrier wave signal, its modulation components, and a single-side-band signal component; a plurality of envelope detector circuits coupled to said circuit means and individually subject to output signal distortion introduced by said single-side-band components for deriving signal components representative of different relative proportions of said modulation components and said distortion; and circuit means for combining proportions of said derived components having distortions of opposite sense to derive an output signal representative of said modulation components and having substantially reduced distortion.

2. In a television receiver, a detector system for picture wave signals comprising: circuit means for supplying an amplitude-modulated picture carrier wave signal, its double-side-band and vestigial-side-band modulation components; a plurality of envelope detector circuits coupled to said circuit means and individually subject to output signal distortion introduced by said vestigial-side-band components for deriving signal components representative of different relative proportions of said modulation components and said distortion; and circuit means for combining proportions of said derived components having distortions of opposite sense to derive an output signal representative of said modulation components and having substantially reduced distortion.

3. In a color-television receiver, a detector system for picture wave signals comprising: circuit means for supplying a picture carrier wave signal and its modulation components including a video-frequency luminance-signal component and a single-side-band chrominance subcarrier signal component; a plurality of detector circuits coupled to said circuit means and individually subject to luminance-signal component distortion introduced by said chrominance subcarrier component for deriving signal components representative of different relative proportions of said luminance-signal component and said distortion; and circuit means for combining proportions of said derived components having distortions of opposite sense to derive an output signal representative of said luminance-signal component and having substantially reduced luminance-signal component distortion.

4. In a color-television receiver, a detector system for picture wave signals comprising: circuit means for supplying a picture carrier wave signal and its modulation components including a video-frequency luminance-signal component and a single-side-band chrominance subcarrier signal component and for supplying a sound carrier signal; a plurality of detector circuits coupled to said circuit means and individually subject to luminance-signal component distortion introduced by said chrominance subcarrier component and said sound carrier signal for deriving signal components representative of different relative proportions of said luminance-signal component and said distortion; and circuit means for combining proportions of said derived components having distortions of opposite sense to derive an output signal representative of said luminance-signal component and having substantially reduced luminance-signal component distortion.

5. In a color-television receiver, a detector system for picture wave signals comprising: circuit means for supplying a picture carrier wave signal and its modulation components including a video-frequency luminance-signal component and a single-side-band chrominance subcarrier signal component; a plurality of detector circuits coupled to said circuit means and individually subject to distortion of said chrominance subcarrier signal component introduced by the single-side-band relation of said chrominance subcarrier component and said picture carrier signal for deriving signal components representative of different relative proportions of said chrominance subcarrier component and said distortion; and circuit means for combining proportions of said derived components having distortions of opposite sense to derive an output signal representative of said chrominance subcarrier component and having substantially reduced chrominance subcarrier signal component distortion.

6. In a color-television receiver, a detector system for picture wave signals comprising: circuit means for supplying a picture carrier wave signal and its modulation components including a chrominance subcarrier signal component in single-side-band relation with said picture carrier signal; a plurality of detector circuits coupled to said circuit means and individually subject to output signal distortion introduced by said single-side-band relation of said picture carrier signal and said chrominance subcarrier component for deriving signal components representative of different relative proportions of said modulation components and said distortion; and circuit means for combining proportions of said derived components having distortions of opposite sense to derive an output signal representative of said modulation components and having substantially reduced distortion.

7. In a color-television receiver, a detector system for picture wave signals comprising: circuit means for supplying a picture carrier wave signal and its modulation components including a chrominance subcarrier signal component in single-side-band relation with said picture carrier signal; a plurality of linear envelope detector circuits coupled to said circuit means and individually subject to output signal distortion introduced by said single-side-band relation of said picture carrier signal and said chrominance subcarrier component for deriving signal components representative of different relative proportions of said modulation components and said distortion; and circuit means for combining proportions of said derived components having distortions of opposite sense to derive an output signal representative of said modulation components and having substantially reduced distortion.

8. In a color-television receiver, a detector system for picture wave signals comprising: circuit means for supplying a picture carrier wave signal and its modulation components including a chrominance subcarrier signal component in single-side-band relation with said picture carrier signal; a plurality of detector circuits coupled to said circuit means and individually subject to output signal distortion introduced by said single-side-band relation of said picture carrier signal and said chrominance subcarrier component for deriving signal components representative of said modulation components, one of said detectors including means for reducing the magnitude of said derived signal component with respect to said distortion to cause said signal components derived by said detectors to be representative of different relative proportions of said modulation components and said distortion; and circuit means for combining proportions of said derived components having distortions of opposite sense to derive an output signal representative of said modulation components and having substantially reduced distortion.

9. In a color-television receiver, a detector system for picture wave signals comprising: circuit means for supplying a picture carrier wave signal and its modulation components including a chrominance subcarrier signal component in single-side-band relation with said picture carrier signal; a pair of diode linear envelope detector circuits coupled to said circuit means and individually subject to output signal distortion introduced by said single-side-band relation of said picture carrier signal and said chrominance subcarrier component for deriving signal components representative of said modulation components, one of said detectors including a frequency-responsive circuit for reducing the amplitude of said derived signal component with respect to said distortion to cause said signal components derived by said detectors to be representative of different relative proportions of said modulation components and said distortion; and circuit means for combining proportions of said derived components having distortions of opposite sense to derive an output signal representative of said modulation components and having substantially reduced distortion.

10. In a color-television receiver, a detector system for picture wave signals comprising: circuit means for supplying a picture carrier wave signal and its modulation components including a chrominance subcarrier signal component in single-side-band relation with said picture carrier signal; a plurality of detector circuits coupled to said circuit means and individually subject to output signal distortion introduced by said single-side-band relation of said picture carrier signal and said chrominance subcarrier component for deriving signal components representative of different relative proportions of said modulation components and said distortion; and circuit means for combining proportions of said derived components having distortions of substantially equal magnitude and of opposite sense to derive an output signal representative of said modulation components and having substantially reduced distortion.

11. In a color-television receiver, a detector system for picture wave signals comprising: circuit means for supplying a picture carrier wave signal and its modulation components including a chrominance subcarrier signal component in single-side-band relation with said picture carrier signal; a plurality of detector circuits coupled to said circuit means and individually subject to output signal distortion introduced by said single-side-band relation of said picture carrier signal and said chrominance subcarrier component for deriving signal components representative of different relative proportions of said modulation components and said distortion; and circuit means including a frequency-responsive network for combining proportions of said derived components having distortions of substantially equal magnitude and of opposite sense at luminance video frequency and having distortions of substantially equal magnitude and opposite sense at chrominance subcarrier frequency to derive an output signal representative of said modulation components and having substantially reduced distortion.

References Cited in the file of this patent

UNITED STATES PATENTS 2,235,859 Wilson ---------------- Mar. 25, 1941